Oct. 21, 1952     R. M. MANNING     2,614,853
ARRESTER TRAP FLOAT VALVE
Filed Nov. 9, 1949
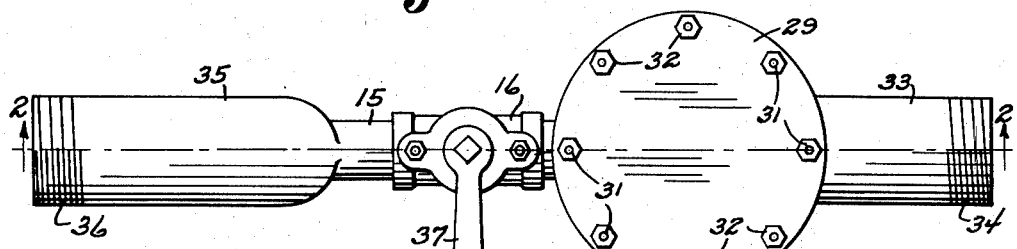
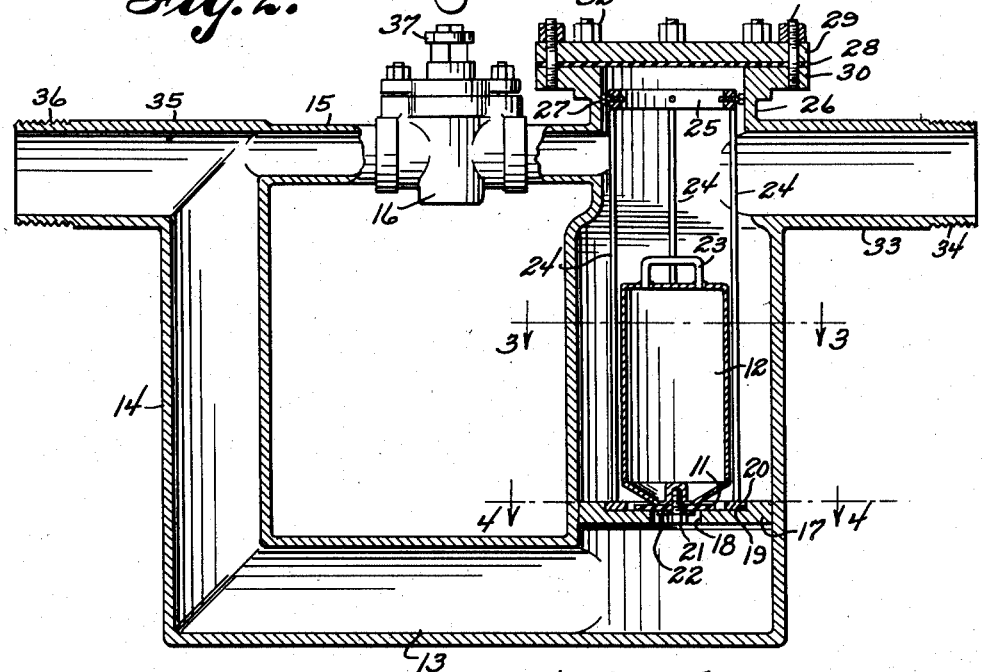
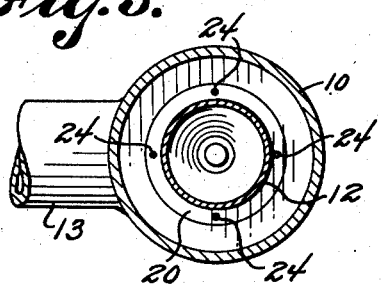
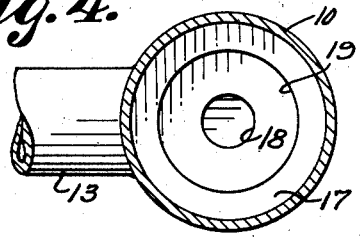
INVENTOR.
Robert M. Manning
BY Victor J. Evans & Co.
ATTORNEYS Patented Oct. 21, 1952

2,614,853

UNITED STATES PATENT OFFICE 2,614,853

ARRESTER TRAP FLOAT VALVE

Robert M. Manning, Pampa, Tex.

Application November 9, 1949, Serial No. 126,387

2 Claims. (Cl. 277—54)

This invention relates to control devices in pipe lines through which fluids are pumped to and from tanks, and in particular a U-shaped trap dropped downwardly from a pipe line with a float actuated valve therein that remains open with liquid in the line and that instantly drops to close the valve when the flow of liquid ceases.

The purpose of this invention is to provide an arrester in a pipe line through which oil and other liquids are pumped to and from tanks and the like which closes the line as the flow of liquid ceases to prevent air passing into the tank or pump.

In numerous instances and particularly in oil fields oil and other liquids are pumped through pipe lines to storage tanks, tank cars, and the like and when the supply of liquid is exhausted air may be pumped into the tank without warning. With this thought in mind this invention contemplates a float controlled arrester and valve wherein the float holds the valve open as long as there is liquid in the pipe line and closes the valve as soon as the liquid is replaced by air or gas.

The object of this invention is, therefore, to provide an arrester in the form of a trap that may be incorporated in pipe lines for pumping liquids to tanks and the like that prevents air from passing through the lines and that does not obstruct the flow of liquid therethrough.

Another object of the invention is to provide a combination trap and arrester for preventing air flowing through pipe lines in which a bleeder bypass is provided for breaking vacuum formed in the lower part of the trap.

A further object of the invention is to provide a combination arrester and float valve in a trap for pipe lines and the like which is of a comparatively simple and economical construction.

With these and other objects and advantages in view the invention embodies a U-shaped trap having a vertical leg and a horizontal leg of the same diameter as the pipe line and a vertical leg of a diameter considerably larger than that of the pipe line with a float control valve in the larger leg and in which a comparatively small bypass with a valve therein is provided across the upper ends of the legs.

Other features and advantages of the invention will appear from the following description taken in connection with the drawings wherein:

Figure 1 is a plan view of the improved pipe line of the arrester trap.

Figure 2 is a vertical section through the trap with parts broken away and parts shown in elevation.

Figure 3 is a cross section through the large leg of the trap and taken on line 3—3 of Figure 2.

Figure 4 is a similar section taken on line 4—4 of Figure 2.

Referring now to the drawings wherein like reference characters denote corresponding parts the arrester trap of this invention includes a U-shaped section having an enlarged vertical leg 10 having a valve 11 with a float 12 attached thereto in the inner part thereof, a horizontally disposed base 13, a vertical leg 14 of the same diameter as that of the pipe line in which the device may be inserted, and a bypass connection 15 with a manually actuated valve 16 therein.

The vertical leg 10 of the trap is formed with an inside diameter substantially larger than the inside diameter of the pipe line whereby fluid may pass around the float 12 and through the valve 11 without obstruction. The area of the casing 10 is sufficiently large to slow up the velocity of liquid passing therethrough so that free floating of the float 12 is obtained. This comparatively large drop chamber in combination with an arrester in a trap of this type permits liquid flowing through the pipe lines to be detoured downwardly through the trap and arrester without retarding the flow thereof at the same time providing freedom of movement of the valve and float control therefor.

A partition 17 with a centrally disposed opening 18 therein extends across the lower part of the cylindrical leg 10 and the valve 11 which is carried by the lower end of the float 12 is positioned to seat in a recess 19 in the upper surface of the partition. A valve guide 20 is also positioned in the recess 19 and the valve 11 is positioned in the valve guide and secured to the lower end of the float 12 by a screw 21 with a washer 22 between the head of the screw and valve. The upper end of the float is provided with a U-shaped bail or handle 23.

The valve guide 20 is provided with upwardly extended rods 24, the upper ends of which are secured to a band 25 and the band is clamped in position in a neck 26 at the upper end of the casing 10 by cap screws 27 which also provide means for adjusting the position of the valve guide. The upper end of the casing 10 is sealed by a gasket 28 which is clamped between a continuous flange 29 and a flange 30 on the upper end of the neck 26 by studs 31 with nuts 32 thereon. By this means the float and valve guide may readily be inserted in and removed from the enlarged vertical leg of the trap to clean and repair the parts.

The upper end of the casing or leg 10 is provided with an inlet nipple 33 having threads 34 on the outer end and the upper end of the arrester leg 14 is provided with a similar nipple 35 having threads 36 on the outer end. These nipples provide means for connecting the trap in the pipe lines.

The valve 16 is provided with a handle 37 by which the valve may be opened, as desired to break vacuum in the lower end of the chamber 10.

With the parts arranged in this manner oil or other liquid is free to flow from the intake side of a pipe line through the trap and arrester and from the discharge side and with the trap full of liquid the float 12 holds the valve 11 upwardly so that the liquid flows through the opening 18 of the partition 17 and when the liquid is exhausted or the leg 10 filled with air, the float 12 will drop and with the valve 11 seated on the partition the passage through the trap is closed.

With this arrester trap installed in a gap in pipe lines it is, therefore, substantially impossible to pump air through the lines into the tank or pump after the liquid is exhausted.

It will be understood that modifications may be made in the design and arrangement of the parts without departing from the spirit of the invention.

What is claimed is:

1. In a pipe line arrestor trap, the combination which comprises a pipe line having a gap therein with a U-shaped section having a base positioned in a plane parallel to and spaced below the pipe line and vertically disposed legs which connect the ends of the base to inlet and discharge portions of the pipe line on opposite sides of said gap, the vertically disposed leg connecting the base to the discharge side of the pipe line providing an arrestor tube and the internal area of said vertically disposed leg forming the arrestor tube and also of the base being equal to that of the pipe line, the area of the vertically disposed leg of the U-shaped section connecting the base to the intake side of the pipe line being greater than that of the pipe line and said leg having a horizontally disposed partition with a centrally positioned opening therein spaced from the lower end, said partition having an annular recess in the upper surface, a lower annular ring positioned in said recess of the partition, an upper annular ring positioned in an upwardly extended section of said vertically disposed leg and aligned with the annular ring in the recess of the partition, spaced vertically disposed rods connecting the annular rings providing a valve guide, an elongated hollow cylindrical float positioned in said valve guide, a valve carried by the lower end of the float and positioned to seat over the centrally positioned opening of the partition, a by-pass connection extended across said trap connecting the pipe line on the intake side of the gap to the pipe line on the discharge side of the gap, and a valve in said by-pass connection.

2. In a pipe line arrestor trap, the combination which comprises a pipe line having a gap therein with a U-shaped section having a base positioned in a plane parallel to and spaced below the pipe line and vertically disposed legs which connect the ends of the base to inlet and discharge portions of the pipe line on opposite sides of said gap, the vertically disposed leg connecting the base to the discharge side of the pipe line providing an arrestor tube and the internal area of said vertically disposed leg forming the arrestor tube and also of the base being equal to that of the pipe line, the area of the vertically disposed leg of the U-shaped section connecting the base to the intake side of the pipe line being greater than that of the pipe line and said leg having a horizontally disposed partition with a centrally positioned opening therein spaced from the lower end, said partition having an annular recess in the upper surface, a lower annular ring positioned in said recess of the partition, an upper annular ring positioned in an upwardly extended section of said vertically disposed leg and aligned with the annular ring in the recess of the partition, spaced vertically disposed rods connecting the annular rings providing a valve guide, an elongated hollow cylindrical float positioned in said valve guide, a valve carried by the lower end of the float and positioned to seat over the centrally positioned opening of the partition, a by-pass connection extended across said trap connecting the pipe line on the intake side of the gap to the pipe line on the discharge side of the gap, a valve in said by-pass connection, the upwardly extended section of the said vertically disposed leg depending from the intake side of the pipe line having an opening therethrough for removing said guide and float, and a closure for said opening.

ROBERT M. MANNING.

REFERENCES CITED

The following references are of record in the file of this patent:

UNITED STATES PATENTS

| Number | Name | Date |
|---|---|---|
| 1,402,835 | Bywater | Jan. 10, 1922 |
| 1,602,279 | Manning | Oct. 5, 1926 |
| 1,643,818 | Manning | Sept. 27, 1927 |
| 1,750,489 | Pippin | Mar. 11, 1930 |
| 2,170,247 | Lambert | Aug. 22, 1939 |